(12) United States Patent
Mittal et al.

(10) Patent No.: US 8,712,035 B2
(45) Date of Patent: Apr. 29, 2014

(54) ONLINE DATA CONVERSION TECHNIQUE USING A SLIDING WINDOW

(75) Inventors: Hemant Mittal, Morgan Hill, CA (US); Sundararao N. Syama, Karnataka (IN); Mehmet Musa, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1393 days.

(21) Appl. No.: 12/012,292

(22) Filed: Jan. 31, 2008

(65) Prior Publication Data

US 2009/0196414 A1 Aug. 6, 2009

(51) Int. Cl.
*H04L 9/28* (2006.01)

(52) U.S. Cl.
USPC ............... 380/28; 713/165; 713/187; 380/37

(58) Field of Classification Search
USPC ............... 380/28, 37; 713/152, 165, 187
See application file for complete search history.

(56) References Cited

U.S. PATENT DOCUMENTS

| | | | | |
|---|---|---|---|---|
| 5,996,025 | A * | 11/1999 | Day et al. | 719/328 |
| 7,277,941 | B2 * | 10/2007 | Ignatius et al. | 709/225 |
| 7,913,042 | B2 * | 3/2011 | Ogihara et al. | 711/165 |
| 2006/0179327 | A1 | 8/2006 | Musa et al. | |
| 2006/0182281 | A1 * | 8/2006 | Taguchi et al. | 380/270 |
| 2008/0069362 | A1 * | 3/2008 | Mimatsu | 380/278 |
| 2008/0256314 | A1 * | 10/2008 | Anand et al. | 711/162 |
| 2008/0260159 | A1 * | 10/2008 | Osaki | 380/277 |

* cited by examiner

*Primary Examiner* — Shewaye Gelagay

(57) ABSTRACT

An embodiment of the invention provides an apparatus and method for online data conversion. The apparatus and method are configured to read data that is overlapped by a window in a first position in a volume, convert the data into a converted text, write the converted text into the volume, and slide the window to a second position in the volume.

27 Claims, 11 Drawing Sheets

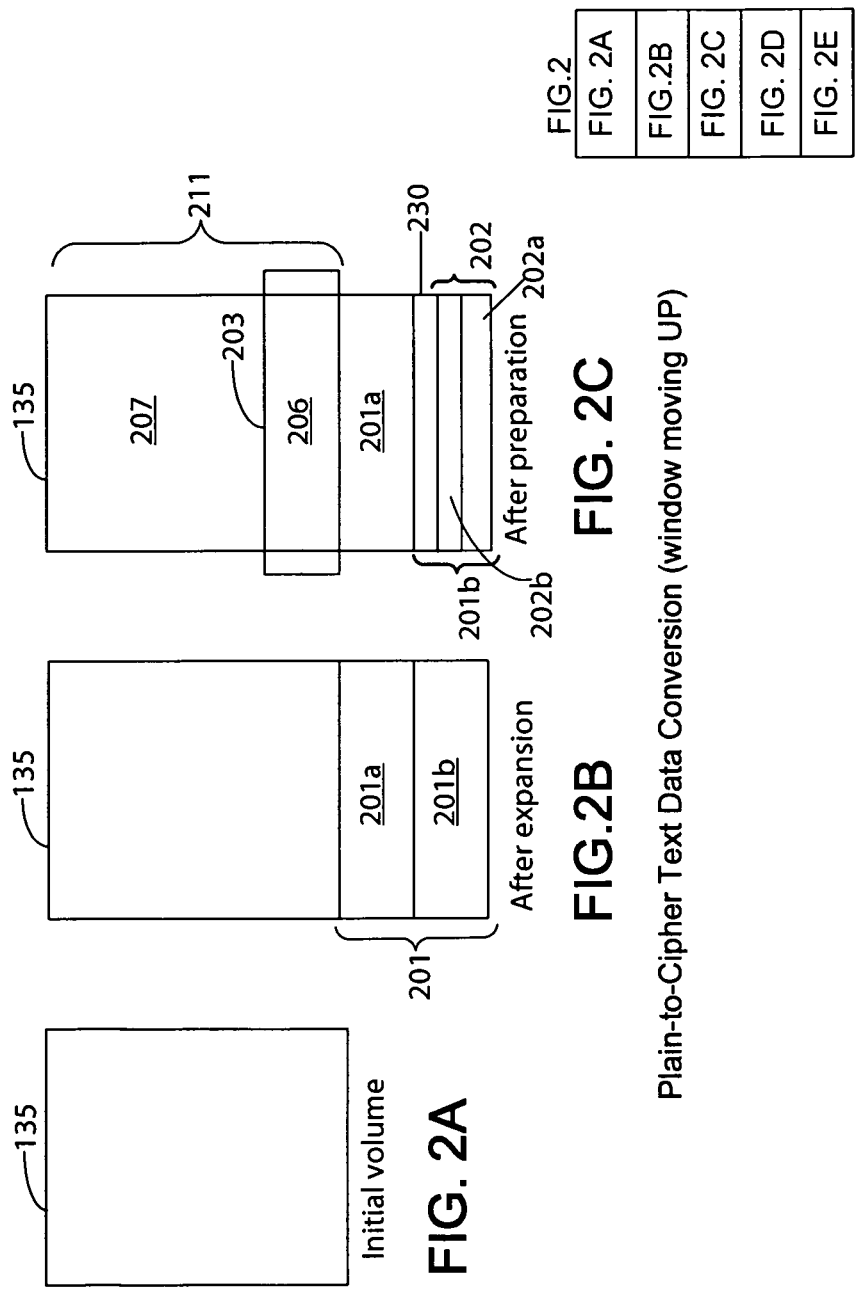

Before conversion

After preparation

Cipher-to-Plaintext
Conversion (window moving DOWN)

| FIG. 5 |
|---|
| FIG. 5A |
| FIG. 5B |
| FIG. 5C |
| FIG. 5D |
| FIG. 5E |

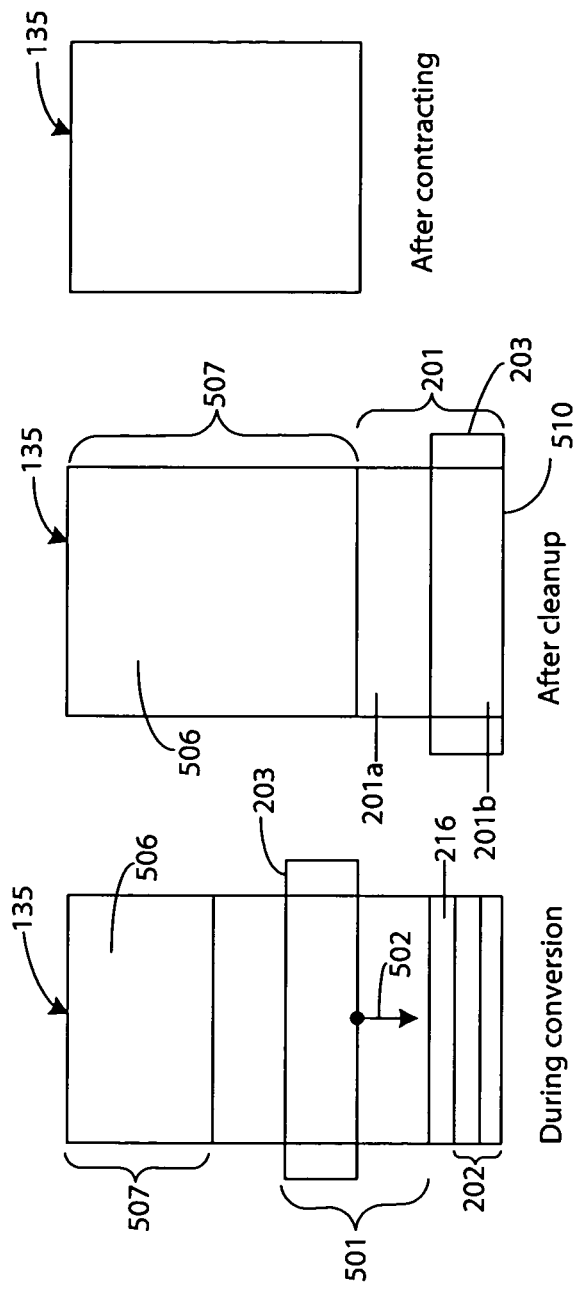

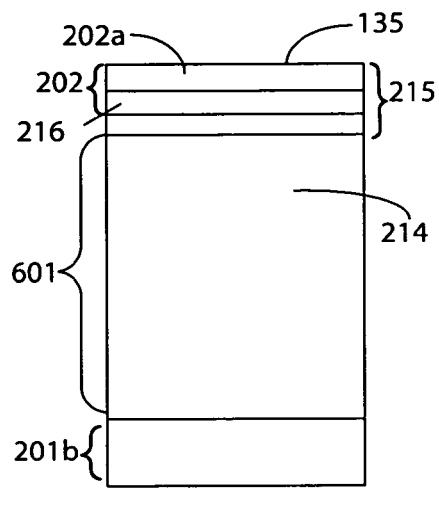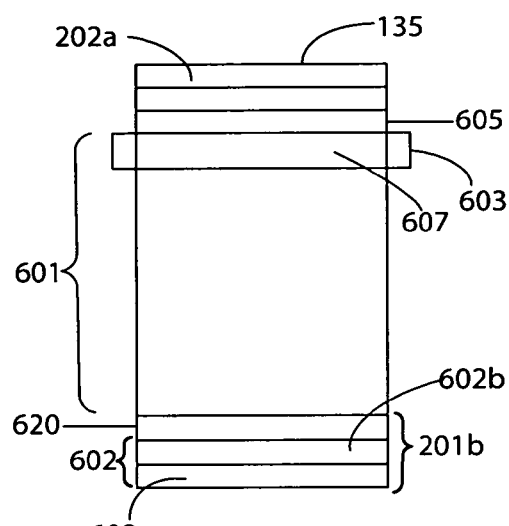
Before conversion
FIG. 6A
After preparation
FIG. 6B
Cipher-to-Cipher Text
Data Conversion
(Window moving DOWN)
| FIG. 6 |
|--------|
| FIG. 6A |
| FIG. 6B |
| FIG. 6C |
| FIG. 6D |

FIG. 6C During conversion

FIG. 6D After cleanup

| FIG. 6A |
| FIG. 6B |
| FIG. 6C |
| FIG. 6D |

| FIG. 7 |
|---|
| FIG. 7A |
| FIG. 7B |
| FIG. 7C |
| FIG. 7D |

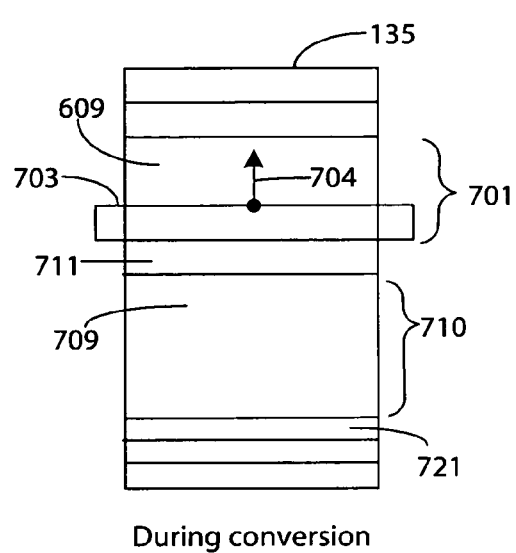
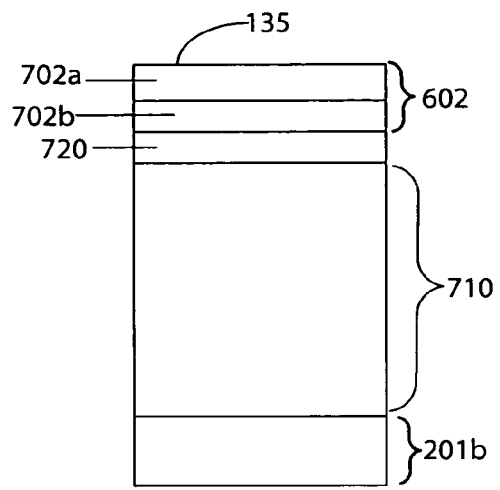
During conversion
FIG. 7C
After cleanup
FIG. 7D
| FIG. 7 |
|---|
| FIG. 7A |
| FIG. 7B |
| FIG. 7C |
| FIG. 7D |

US 8,712,035 B2

ONLINE DATA CONVERSION TECHNIQUE USING A SLIDING WINDOW

TECHNICAL FIELD

Embodiments of the invention relate generally to an online data conversion technique.

BACKGROUND

Encryption is the conversion of data into an encrypted form that is known as "cipher text" which is not easily understood by unauthorized personnel. Decryption is the conversion of the cipher text back into the original form of the data (i.e., plain text). Current file and volume encryption technology permits the storage of data into backup media (e.g., disk, tape or memory device) in the encrypted form so that the data is not comprehensible to unauthorized personnel. The encryption can be applied to individual files, or applied to the entire data in a volume that is formed by a physical storage disk. One example of a file and volume encryption technology is the HP-UX Encrypted Volume and File System (EVFS) which is commercially available in various products from Hewlett-Packard Company.

One limitation of current technology is that applications are required to be shut down and are not able to access volume data when the volume is being configured for storing the cipher text (encrypted text), when the data encryption key is being changed (re-keying), or when the volume is being reconverted for storing the plain text (decrypted text). When the volume is being configured for encryption, the following steps are required: (1) the application(s) that are using the volume are shut down, (2) the plain text data in the volume are backed up on a backup media (e.g., tape or disk), (3) the volume space is extended to create space for the encryption metadata, (4) the volume is initialized by writing the encryption metadata at the beginning of the volume, (5) the volume is brought online (enabled for encryption), (6) the plain text data are restored from the backup media to the volume as encrypted text, and (7) the applications(s) that were previously shut down are re-started. Similar steps above (e.g., backing up the volume data and restoring the volume data) are performed if the volume data is re-keyed (i.e., re-encrypted) or is converted from cipher text to plain text (decrypted text).

In computing environments with very large volumes (e.g., sizes of terabytes or petabytes), applications will need to be turned off for a significant amount of time (e.g., many hours or days) until the entire volume data is converted from plain text to cipher text. Furthermore, certain customer environments (e.g., financial service industry entities such as banks) have security policies that often require data to be re-encrypted regularly by using newly-generated data encryption keys, so that data security is maintained or increased. The enforcement or practice of such security polices results in a required down time for applications for each time data is re-encrypted using newly-generated data encryption keys. The regular shutdown of applications while the volume data is being regularly re-encrypted results in a longer downtime period that may not be acceptable for some customers (e.g., customers who use enterprise computing systems). Therefore, the current technology is subjected to at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 2A-2E are diagrams that illustrate various details of an online data conversion method (plain text to cipher text data conversion), in accordance with an embodiment of the invention.

FIGS. 5A-5E are diagrams that illustrate various details of an online data conversion method (cipher text to plain text data conversion), in accordance with an embodiment of the invention.

FIGS. 7A-7D are diagrams that illustrate various details of an online data conversion method (second example of cipher text to cipher text data conversion), in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
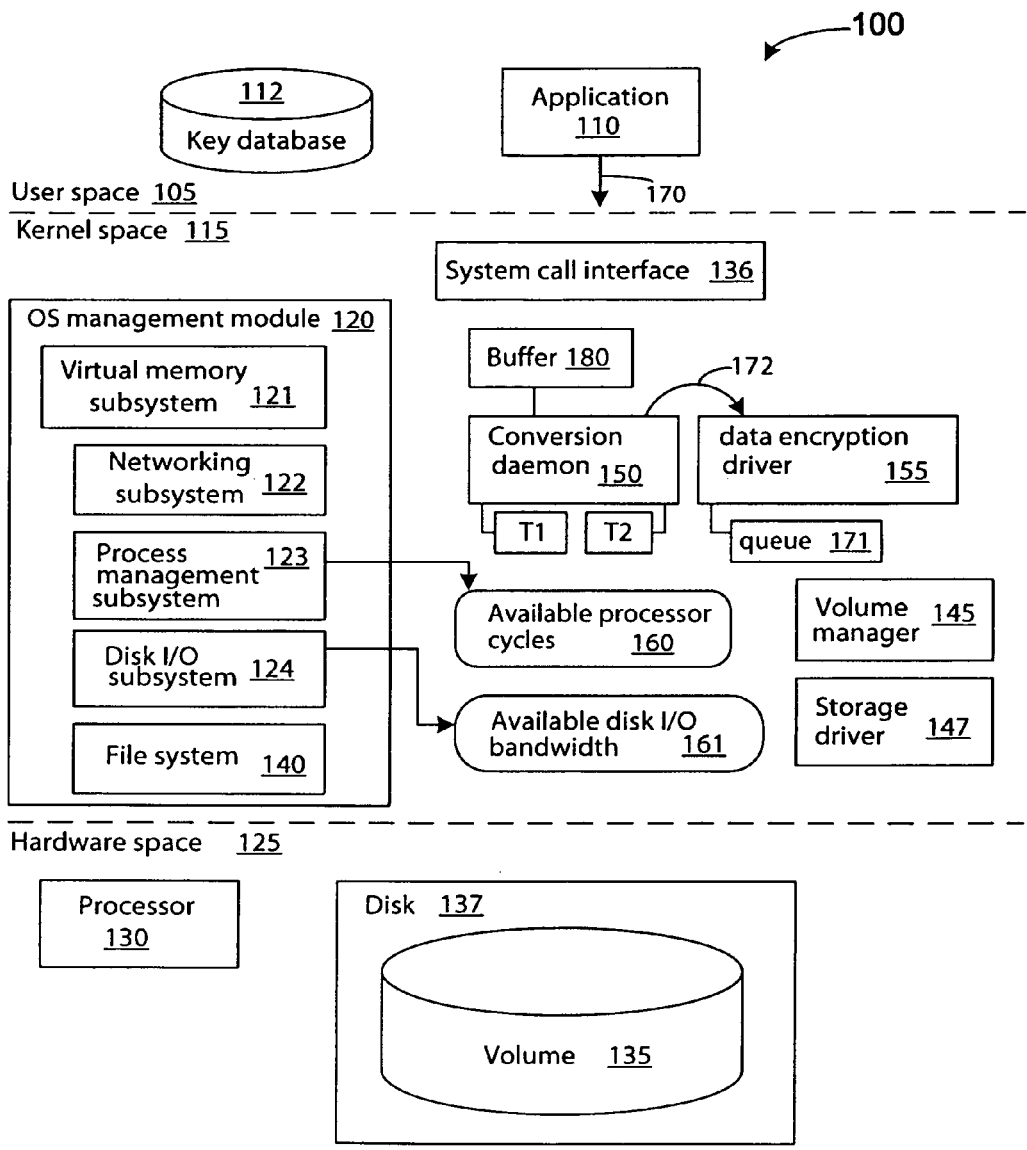
FIG. 1 is a block diagram of an apparatus (system) in accordance with an embodiment of the invention.

FIG. 1 is a block diagram of a system (apparatus) 100 in accordance with an embodiment of the invention. The system 100 is typically a computer system that is in a computing device. A user space 105 will have one or more application software 110 that will run in the system 100. A key database 112 (or application 112) provides the public-private key pairs used to protect data encryption keys that in turn are used for encrypting the data in the volumes 135, as discussed below. A kernel space 115 includes an operating system management module 120 with various known operating system elements such as, for example, a virtual memory subsystem 121, networking subsystem 122, process management subsystem 123, disk I/O subsystem 124, and file system 140, and/or other known subsystems that permit an operating system to perform various known functions. The OS management module 120 can also include kernel data structures to permit various operating system operations and/or other modules that can be loaded into the kernel space 115.

A hardware space 125 includes a processor 130 for performing processing functions and disk resources that includes one or more volumes 135. A volume 135 is typically formed in a physical storage disk 137. Other standard elements in the computer system 100 are not shown in FIG. 1 for purposes of focusing the discussion on features of embodiments of the invention.

The kernel space 115 also includes a system call interface 136 for receiving and transmitting the system calls between the user space 105 and the kernel space 115. A file system 140 manages the files and folders that are stored in the volumes 135 in the hardware space 125. A volume manager 145 manages the storage of data in the volumes 135. A storage device driver 147 reads data from (or writes data to) the volumes 135, in response to a read request or write request, respectively, from the user space 105.

In accordance with an embodiment of the invention, a conversion daemon 150 and data encryption driver 155 are used for performing an online data conversion method as will be discussed below in additional details. Data conversion can be three different scenarios or types: configuration, re-keying, or de-configuration. Configuration is the operation of converting plain text data (non-encrypted data) into cipher text data (encrypted data). Re-keying is the operation of changing the encryption keys of a currently-encrypted data. De-configuration is the operation of converting cipher text data into plain text data. As also discussed in the various examples below, each of the configuration scenario, re-keying scenario, and de-configuration scenario typically includes a preparation phase, conversion phase, and cleanup phase. In the preparation phase of the configuration scenario, a volume is first extended and encryption metadata (EMD) is written in the volume space that is formed by extending the volume. As an example, a volume is extended by an amount that is equal to approximately two times the size of the EMD. In order to extend a volume 135, the volume manager 145 (FIG. 1) reserves (allocates) an appropriate amount of disk blocks in a physical disk 137 that contains the volume 135. For example, the amount of disk blocks that are allocated for the extended space of the volume is equal to about two times the size of the EMD. Each disk block is, for example, 1 KB of disk space in the disk 137. However, it is within the scope of embodiments of the invention for a disk block to be at other sizes. These allocated (reserved) disk blocks will form the extended volume space, and the conversion daemon 150 (FIG. 1) will then write the EMD in this extended volume space, as will be discussed further in the examples below. Disk block allocation techniques that are performed by volume managers are known to those skilled in the art. It is also noted that in the re-keying scenario and de-configuration scenario that will be discussed below, the volume extension step is not necessary since this extended space was previously allocated by the volume manager 145 during the previous configuration phases, and this extended space has not yet been released (i.e., de-allocated) from the volume.

Reference is first made to FIGS. 2A-2E in order to illustrate an online data conversion method in accordance with an embodiment of the invention, where plain text is converted to cipher text (encryption method). Note that examples of cipher text to plain text data conversion (decryption method) and cipher text to cipher text data conversion (re-keying method) will also be discussed below. Prior to the preparation phase, the initial volume is shown as volume 135 in FIG. 2A. During the preparation phase, the volume manager 145 will extend the volume 135. As mentioned above, a volume 135 can be extended by allocating additional disk blocks for the volume. As an example, a volume is extended by an amount that is equal to approximately two times the size of the encryption metadata (EMD). The size of the EMD is typically fixed. For example, if the EMD is 2 MB, then the volume 135 is extended by space 201 (FIG. 2B) of size 4 MB. The extended volume spaces 201*a* and 201*b* are each 2 MB in this example. At this time, spaces 201*a* and 201*b* are free spaces (unused disk blocks).

In FIG. 2C, the preparation phase has been completed and the EMD 202 has been written by the conversion daemon 150 (FIG. 1) into the extended space 201*b* (which is at one end of the volume 135). The EMD 202 is formed by a new key 202*a* (which is an encryption key to be used for the encrypted data 214 in the volume 135) and persisted info 202*b* (which indicates the size, movement direction, and position of a window 203 that is to be discussed below). The area 230 in the extended space 201*b* remains as a free space since area 230 does not contain any of the EMD 202. Note also that additional known encryption techniques are used for the encryption key 202*a* such as, for example, encrypting the encryption key 202*a* with a public key.

In an embodiment of the invention, a window 203 will slide from one end of the volume 135 to the other end of the volume 135. The size of the window 203 is typically equal to the size of the EMD 202 in the configuration (plain-to-cipher text conversion) scenario and in the de-configuration (cipher-to-plain text conversion) scenario. In the re-keying (cipher-to-cipher text data conversion) scenario, the size of the window 203 is typically equal to a free space area (reserved area) in an extended volume space after the EMD is stored in the extended volume space, as discussed in an example below.

The data encryption driver 155 (FIG. 1) views the entire volume 135 as partitioned into two sections: (1) the old Section 211 which contains the old data (i.e., data prior to performing the conversion) and (2) the new Section 212 (FIG. 2D) which contains the converted data (i.e., the old data after performing the conversion). The sliding window 203 is positioned at the end of the old Section 211 and covers the plain text data 206. Therefore, in FIG. 2C (which occurs after the preparation phase and before the conversion phase), the sliding window 203 is covering the plain text 206 which is part of the old section 211.

The conversion daemon 150 watches the amount 160 (FIG. 1) of available processor cycles and an amount 161 of available disk I/O (input/output) bandwidth. The processor cycles are the resources in the processor 130 that are being consumed by software threads or processes in the system 100. The disk I/O bandwidth is the bandwidth resources that are being consumed by requests to the disks 137. The process management subsystem 123 (FIG. 1) can track the amount 160 of available processor cycles by measurement of the processor load. The disk I/O subsystem 124 can track the amount 161 of available disk I/O bandwidth by measurement of the disk I/O bandwidth load. Alternatively, the amounts 160 and 161 are values that indicate processor load or disk I/O bandwidth consumption, respectively.

If the amount 160 of available processor cycles 160 is above (or has reached) a threshold value T1 and the amount 161 of available disk I/o bandwidth is above (or has reached) a threshold value T2, then the conversion daemon 150 will perform the read-convert-write-slide steps below in order to convert the data within a window 203 (e.g., FIG. 2C) in the volume 135. The threshold values T1 and T2 can be tunable or adjustable by a user. Relatively higher values of T1 and T2 will have lesser impact on the performance of applications and increase the amount of time to perform the data conversion, because less time slots are being used to perform the data conversion and more time slots will be available for use by the applications. Relatively lower values of T1 and T2 will increase the impact on the performance of applications and decrease the amount of time to perform the data conversion, because more time slots are being used to perform the data conversion and less time slots will be available for use by the applications.

During the conversion of data, the conversion daemon 150 will read the plain text 206 in the window 203, then convert the plain text 206 into the cipher text 214 (FIG. 2D), then write the cipher text 214 in the space 201a in volume 135, and then slide the window 203 in the direction 208 in order to convert the additional plain text 209 into cipher text 214. The conversion daemon 150 will then again wait for the available processor cycles and available disk I/O bandwidth to increase above the threshold values T1 and T2, respectively. When the available processor cycles 160 has reached (or goes above) the threshold value T1 and the available disk I/O bandwidth has reached (or goes above) the threshold value T2 as discussed above, then the conversion daemon 150 can again perform the above read-convert-write-slide steps in order to convert the plain text 209 in window 203 into cipher text 214. The converted data from plain text 209 is written by the daemon 150 as cipher text into the adjacent free space 219. As a result, the converted data 214 does not overwrite any current data in the volume 135 because the converted data 214 is always being written into free space. This feature eliminates the occurrence of data corruption during unexpected system re-boot because no current data is overwritten by the converted data 214.

The conversion daemon 150 will perform the above watch step and read-convert-write-slide steps until the window 203 has reached the beginning boundary 210 of volume 135.

Figures 2D, 2E:
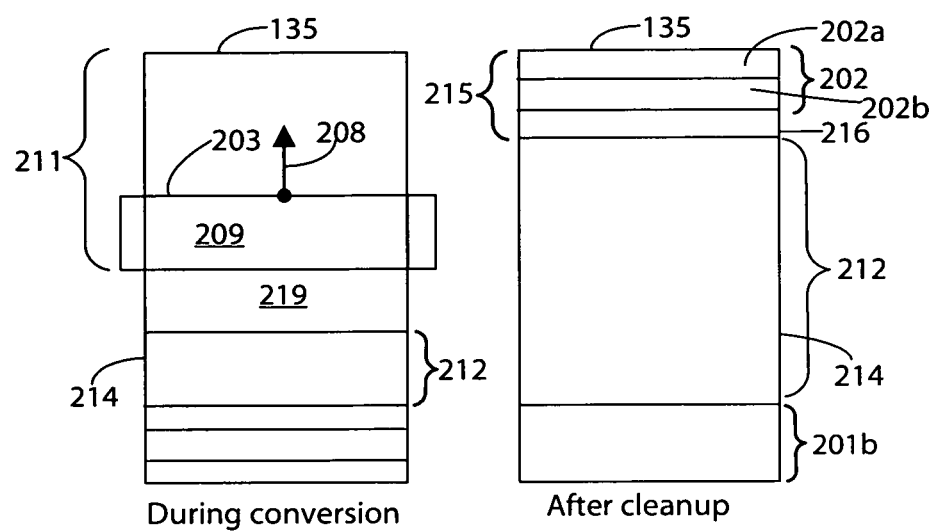

As shown in FIG. 2D, during the conversion phase, the window 203 slides in the direction 208. The conversion daemon 150 (FIG. 1) converts the plain text 209 that is overlapped by the window 203. The window 203 slides in direction 208 until reaching the beginning boundary 210 of the volume 135. The beginning boundary 210 (which is formed by the first disk block of the volume 135) is typically identified by encryption metadata (EMD) that is maintained by the encryption driver 155 (FIG. 1). The new section 212 will contain the encrypted data (cipher text data) 214. The section 215 (FIG. 2E) will initially be a free space that will then subsequently store the EMD 202. The volume 135 will contain the cipher text data 214 and will not contain the plain text data when the conversion phase has been completed in FIG. 2E. Also, the beginning section 215 will contain the free space 216 because the EMD 202 will not occupy all of the disk blocks in the beginning section 215.

FIG. 2E shows the volume 135 after the cleanup phase. In the cleanup phase, the conversion daemon 150 copies the EMD 202 from the extended section 201b to the beginning section 215 of the volume 135. The daemon 150 also deletes the EMD 202 from the extended section 201b at the bottom end of the volume 135. As a result, the extended section 201b at the bottom end of the volume 135 will contain free space. The benefit of having the free space at extended section 201b will be discussed below.

Note that the window 203 will overlap a given number of disk blocks. In an implementation, the window 203 is typically 1 MB in size. However, in a simplified example, if a window 203 is 10 KB in size, then the window 203 will overlap 10 disk blocks (data blocks) where each disk block is, e.g., 1 KB. As known to those skilled in the art, a volume manager 145 identifies a disk block by its disk block number. In FIG. 2C, the window 203 is currently overlapping, for example, the disk block numbers #50 to #59. Therefore, the conversion daemon 150 will read (typically by use of storage driver 147 in FIG. 1) the plain text 206 in disk block numbers #50 to #59, store this plain text 206 in a buffer 180 (FIG. 1), and the conversion daemon 150 will then convert this plain text data 206 into the cipher text 214. The conversion daemon 150 will then write this cipher text data 214 into the section 201a which would contain, for example, the disk block numbers #60 to #69 and which is the free space that is adjacent to the current position of window 203. FIG. 2D shows the cipher text data 214 as having been written into the section 201a of volume 135.

In FIG. 2D, the window 203 is overlapping, for example, the disk block numbers #40-49. The conversion daemon 150 performs the similar method above so that the plain text 209 is converted into cipher text 214 which would then be written into the section 219 which contains disk block numbers #50 to #59 and which is adjacent to the current position of window 203.

Figure 3:
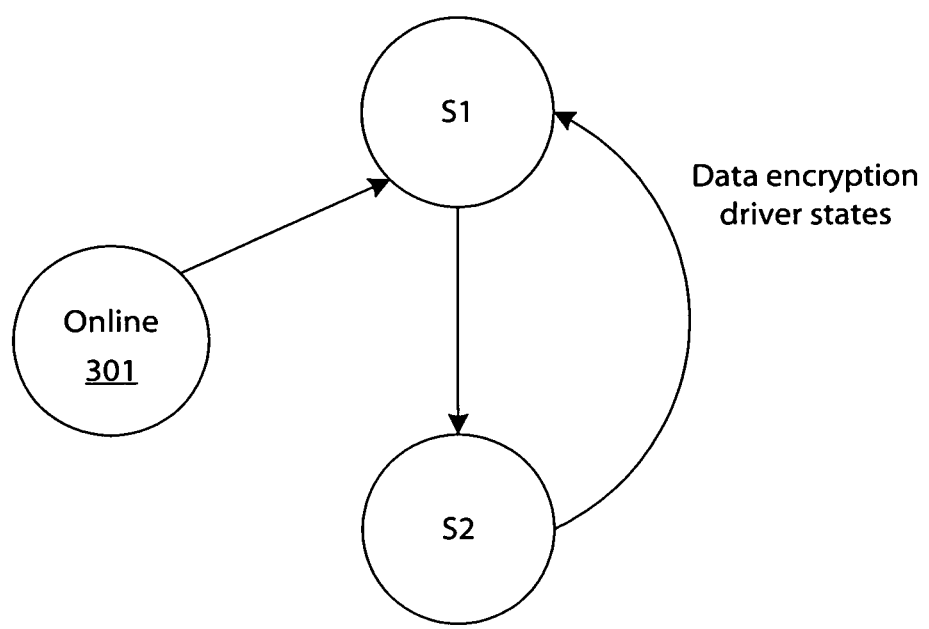
FIG. 3 is a state diagram that illustrates the various states of a data encryption driver in accordance with an embodiment of the invention.

FIGS. 3 is a state diagram of the various states of the data encryption driver 155 (FIG. 1) during the conversion phase, in accordance with an embodiment of the invention. It is noted that the state diagram of FIG. 3 applies to the plain text to cipher text conversion steps in the example of FIGS. 2A-2E and to the below discussed examples of cipher text to plain text conversion and cipher text to cipher text conversion.

In the online state 301, the conversion daemon 150 (FIG. 1) is not watching for the available processor cycles and available disk I/O bandwidth to surpass (or reach) T1 and T2, respectively, and is also not performing any conversion of the data in the window 203. The data encryption driver 155 services requests 170 (FIG. 1) (e.g., reads or writes) from an application 110 to the volume 135. If the read or write request 170 is for data that is in new section 212 (FIG. 2D), then the driver 155 will decrypt the data read from the volume 135 into plain text for transmission to the application 110 and encrypt the data into cipher text before transmitting to the volume 135 for writing. If the read or write request 170 is for data that is in old section 211 (FIG. 2D), then the driver 155 will proceed with the read or write requests to the volume 135 without any data transformation.

When the conversion daemon 150 (FIG. 1) is watching for available processor cycles and available disk I/O bandwidth to surpass (or reach) the threshold values T1 and T2, respectively, the driver 155 (FIG. 1) is in state S1. When the threshold values T1 and T2 are surpassed (or reached), the daemon 150 will signal 172 (FIG. 1) the driver 155 to move to state S2.

In state S1, the driver 155 processes all incoming reads or writes to the old section 211 (FIG. 2C). If a read or write request extends to both the old section 211 and new section 212, then the driver 155 will break the request into two separate requests (one request for each section) and then proceed to process each read or write requests to the volume 135. Therefore, in state S1, the driver 155 continues to perform normal processing of requests such as, for example, it encrypts the data before it sends to the volume 135 and decrypts of data after it reads from the volume 135 for the requests in new section 212. The driver 155 does not transform data for the reads and writes in old section 211.

In state S2, the conversion daemon 150 is using processor cycles and disk I/O bandwidth to perform the above mentioned read-convert-write-slide steps for converting the volume data in a window 203 (FIG. 2C). In state S2, since the conversion daemon 150 is converting the data (e.g., data 206 in FIG. 2C) that is overlapped by the window 203, the driver 155 will hold all requests 170 (FIG. 1) in a queue 171 (FIG. 1), if the requests 170 is for the data that is overlapped by the window 203. The driver 155 also processes all other incoming requests 170 for other volume data that are not currently overlapped by the window 203.

The conversion daemon 150 (FIG. 1) uses signal 172 to the driver 155 to change its state. When the conversion daemon 150 requests the driver 155 to change between the above states (online, S1 and S2), the driver 155 will first buffer the incoming request(s) 170 and the daemon 150 will wait for the completion of any in-progress reads/writes. The daemon 150 then performs the read-convert-write-slide steps. The driver 155 can then release the incoming request(s) 170 that were previously buffered so that the read or write operations to the volume 135 can continue.

Note also that when the state of the driver 155 moves from online 301 to S1 (FIG. 3), the daemon 150 will mark the start position of the window 203 into the persistent info area 202b (FIG. 2C), so that the position of the window is recorded into a metadata. As discussed above, during state S1, the daemon 150 is performing the above mentioned watch step. When the state of the driver 155 moves from S1 to S2, the daemon 150 will be performing the above-mentioned read-convert-write-slide steps.

When the state of the driver 155 moves state S2 to state S1, the daemon 150 has completed the window slide step (i.e., the-sliding of the window 208 in direction 208 as best shown in the example of FIG. 2D) and will be performing the watch step. The daemon 150 will also mark the new position of the window 203 in the persistent info area 202b (FIG. 2C) since the window 203 has moved to the new position. As a result, since the new position of the window 203 is recorded in metadata, the daemon 150 can determine this new position of the window 203 in the event of a system crash and system re-start. Any buffered requests 170 in the queue 171 are also released by the driver 155 so that reads or writes are performed on the volume 135.

When the state of the driver 155 moves from state S2 to online state 301, the daemon 150 has converted all of the appropriate data in the volume 135. The daemon 150 marks the end position 210 (FIG. 2D) into the persistent info area 202b to indicate that all of the appropriate data in the volume 135 has been converted. Additionally, any buffered requests 170 in the queue 171 are also released by the driver 155 so that reads or writes are performed on the volume 135.

Figure 4:
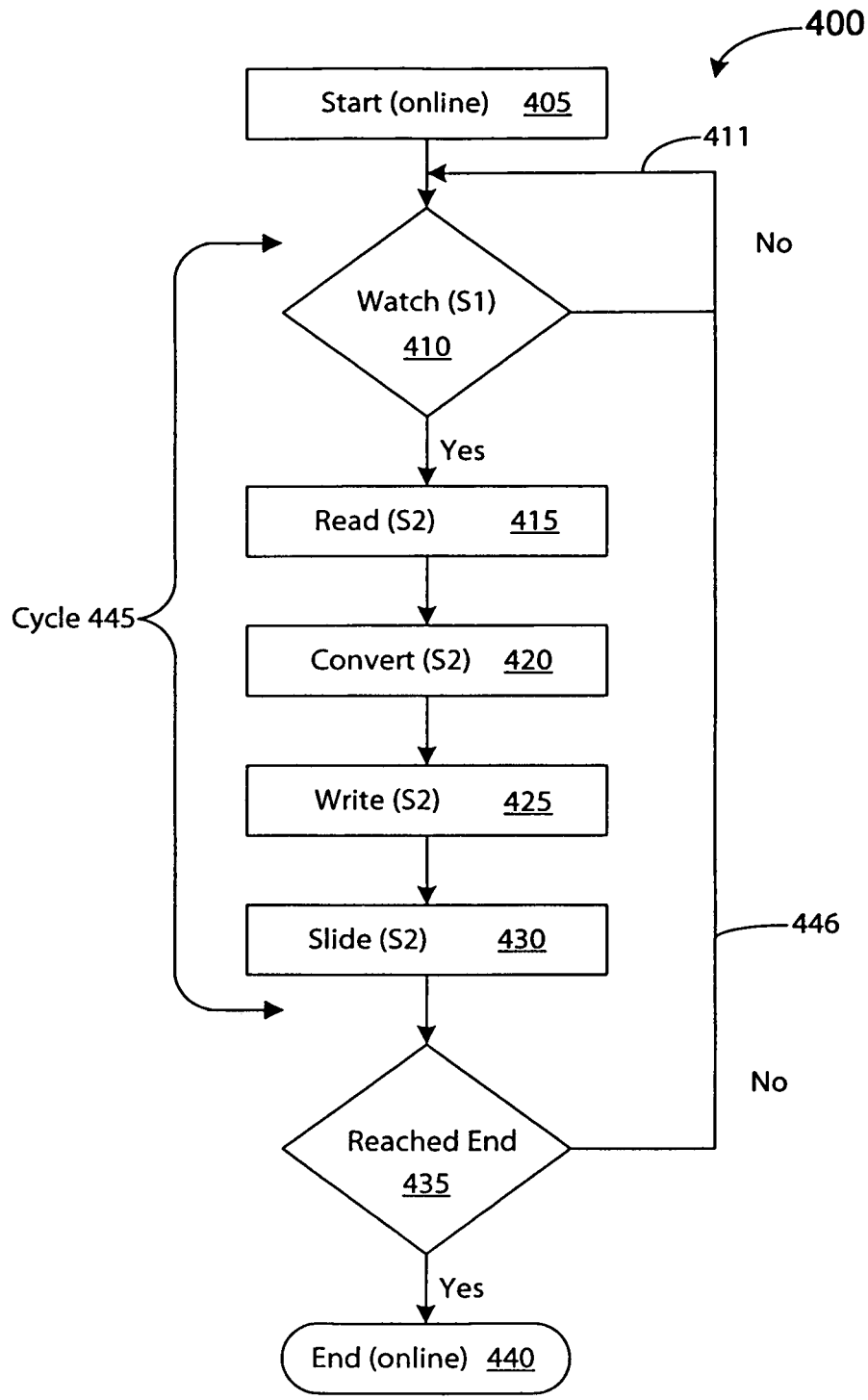
FIG. 4 is a flowchart of a method that is performed by a conversion daemon in accordance with an embodiment of the invention.

FIG. 4 is a flowchart of a method 400 that is performed by the daemon 150, in accordance with an embodiment of the invention. In block 405, the daemon 150 is not yet performing any operations related to data conversion. The driver 155 is also currently in the online state 301.

In block 410, the daemon 150 performs the watch step which involves watching for available processor cycles and available disk I/O bandwidth to surpass (or reach) the threshold values T1 and T2, respectively. The driver 155 will also move from the online state 301 to state S1. If the threshold values T1 and T2 are not surpassed (or not reached), then daemon 150 remains in block 410 as shown by the loop 411.

If the threshold values T1 and T2 are surpassed (or reached), then the daemon 150 will perform the read step in block 415. The daemon 150 will request the driver 155 to change its state to S2 and will read the data that is overlapped by the window 203 for storage into a buffer 180 (FIG. 1). Since the buffer 180 will store the data that is read from window 203, an embodiment of the invention advantageously avoids the backup step of previous approaches. This backup step involves backing up the entire volume data into a backup media and this backup step results in additional downtime for the applications that need to read or write data to the volume 135. In block 415, the driver 155 will move from state S1 to state S2.

In block 420, the daemon 150 will convert the data that has been read from the window 203 in the volume 135 and buffered in the buffer 180. The conversion can be from plain text to cipher text conversion (i.e., data encryption) as discussed in FIGS. 2A-2E above. The conversion can be from cipher text to plain text conversion (i.e., data decryption) as discussed below. The conversion can also be from cipher text to cipher text conversion (i.e., re-keying) as discussed below. The cipher text to cipher text conversion involves converting the cipher text data (that is encrypted by an encryption key) into plain text and then converting the plain text data into cipher text data (that is encrypted by a different encryption key). In block 420, the driver 155 remains in state S2.

In block 425, the daemon 150 will write the converted data into the volume 135. As discussed above, the daemon 150 writes the converted data only in free spaces in the volume 135, and this feature advantageously avoids the corruption of data in the volume 135. Typically, this free space for receiving the converted data is in a volume area that is next to the current position of the window 203 as shown in, for example, FIGS. 2C and 2D. In block 425, the driver 155 remains in state S2.

In block 425, the daemon 150 will slide the window 203 to the next set of disk blocks in the volume 135. The window 203 will slide in a space amount that is equal to the window size so that a next set of data are converted by the daemon 150. In block 430, the driver 155 remains in state S2.

In block 435, if this next set of disk blocks (on which the moved window 203 now overlaps) is at the end boundary of the volume, then in block 440 the daemon 150 ends the watch-read-convert-write-slide cycle 445 and the driver 155 moves from state S2 to the online state 301. On the other hand, in block 435, if this next set of disk blocks (on which the moved window 203 now overlaps) is not at the end boundary of the volume, then the daemon 150 moves (via loop 446) to block 410 to again perform the watch step and the driver 155 moves from state S2 to state S1. The daemon 150 will watch for available processor cycles and available disk I/O bandwidth to surpass the threshold values T1 and T2, respectively, in order to convert the data that is currently overlapped by the window 203.

The conversion daemon 150 (FIG. 1) commits (stores) the size, movement direction, and position of the window 203 in a persistent info area 202b of the EMD 202 at the end of each watch-read-convert-write-slide cycle 445. If a system crash interrupts the conversion process (i.e., any of steps 415-430), the conversion daemon 150 retrieves the position of the window 203 in the volume 135 from the persistent info area 205 and resumes processing automatically after system re-start by continuing the watch-read-convert-write-slide cycle 445.

FIGS. 5A-5E illustrates an online data conversion method in accordance with an embodiment of the invention, where cipher text is converted to plain text (decryption method). Note that the volume extension step is not necessary in this example, because the disk blocks of the extended spaces 201 (FIG. 2B) were previously allocated to the volume 135 and have not yet been de-allocated from the volume 135. The old section 501 of volume 135 will contain the cipher text 214. The beginning section 215 of volume 135 contains the EMD 202 as well as free space 216.

Figure 5A:
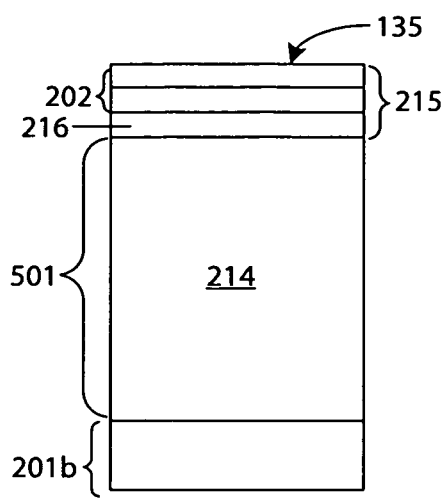
Figure 5B:
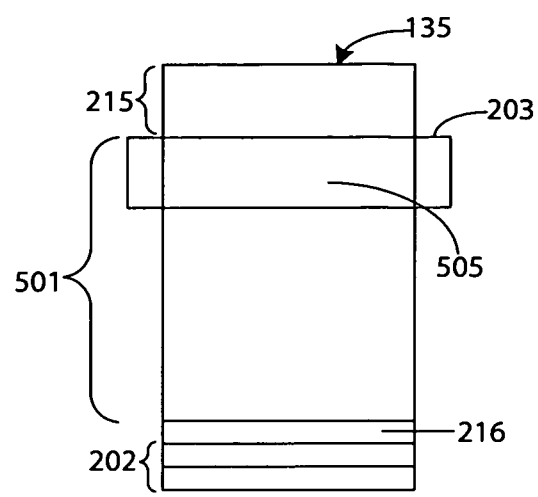

During the preparation phase, the daemon 150 will copy the EMD 202 and free space 215 in beginning section 215 to the end section 201b which has free space. FIG. 5B shows the volume 135 after the preparation phase. The daemon 150 will also delete the EMD 202 from the beginning section 215. As a result, the beginning section 215 will have free spaces as shown in FIG. 5B.

In FIG. 5B, the preparation phase has been completed and the EMD 202 has been written by the conversion daemon 150 (FIG. 1) into the end section 201b. The free space 216 is area in the end section 201b that is not occupied by the EMD 202.

In an embodiment of the invention, a window 203 will slide from one end of the volume 135 to the other end of the volume in the direction 502, as shown in FIG. 5C. The size of the window 203 is typically equal to the size of the EMD 202 in the de-configuration (cipher-to-plain text conversion) scenario. The sliding window 203 is positioned at the beginning of the old Section 501 and covers cipher text data only. Therefore, in FIG. 5B (which occurs after the preparation phase and before the conversion phase), the sliding window 203 is covering the cipher text 505 which is part of the old section 501.

The conversion daemon 150 watches the amount 160. (FIG. 1) of available processor cycles and an amount 161 of available disk I/O (input/output) bandwidth. If the amount 160 of available processor cycles 160 is above (or has reached) a threshold value T1 and the amount 161 of available disk I/O bandwidth is above (or has reached) a threshold value T2, then the conversion daemon 150 will perform the read-convert-write-slide steps (steps 415 to 430 in FIG. 4) in order to convert the data in the volume 135. During the conversion of data, the conversion daemon 150 will read the cipher text 505 in the window 203, store the cipher text 505 in buffer 180, and then convert the cipher text data 505 into a plain text. The daemon 150 will then write the plain text into the beginning space 215 (FIG. 5B) which currently contains free space. FIG. 5C shows the new section 507 that contains the plain text data 506 which is data that has been converted from cipher data that has been read from the previous positions of window 203.

In FIG. 5D, the cleanup phase has been performed. During the cleanup phase, the daemon 150 will delete the EMD 202 from the end space 201b because the plain text 506 in the volume will no longer require the metadata for the encryption keys. Therefore, end space 201b will contain free space. The space 201a will also contain free space because, as discussed above, the volume space adjacent to the sliding window 203 is maintained as a free space. Therefore, when the window 203 has reached the end boundary 510 (FIG. 5D) of the volume 135, the space 201a (which will be adjacent to the window 203) will also be a free space.

In FIG. 5E, the volume 135 is contracted because the extended space 201 is de-allocated from the volume 135. This de-allocation step typically involves the volume manager 145 (FIG. 1) performing a de-allocation (freeing up) of disk blocks that were reserved for the volume 135.

Figure 6:
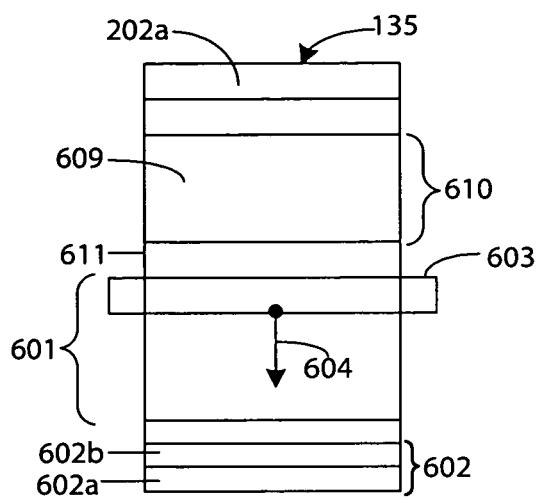
FIGS. 6A-6D are diagrams that illustrate various details of an online data conversion method (first example of cipher text to cipher text data conversion), in accordance with an embodiment of the invention.
Figure 6:
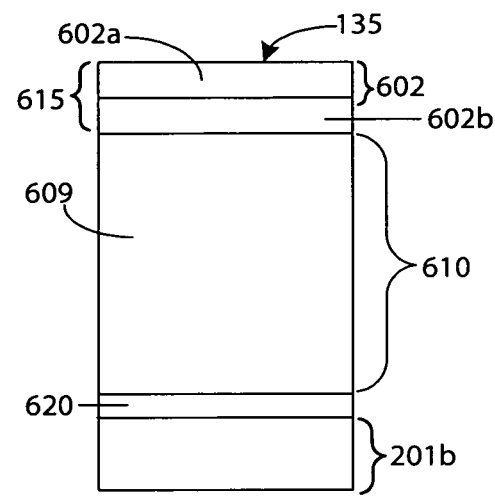

FIGS. 6A-6D illustrates an online data conversion method in accordance with an embodiment of the invention, where cipher text is converted to cipher text (re-keying method). The state of the volume 135 in FIG. 6A is the same as the state of the volume 135 in FIG. 5A. The old section 601 of volume 135 will contain the cipher text 214. The beginning section 215 of volume 135 contains the EMD 202 as well as free space 216. The EMD 202 includes the key 202a which is an encryption key for the cipher data 214. Note also that additional known encryption techniques are used for the encryption key 202a such as, for example, encrypting the encryption key 202a with a public key.

During the preparation phase, the daemon 150 will create a new EMD 602 (FIG. 6B) which will contain a new data encryption key 602a for re-encrypting the cipher text data into a new cipher text data as discussed below. Note that the data encryption keys are typically generated and encrypted using the public key obtained from the key database 112 (FIG. 1) by the conversion daemon 150. The daemon 150 will write the new EMD 602 in the end section 201b of volume 135. Free space 620 will typically remain for disk blocks (in end section 201b) that do not contain any of the EMD 602 information.

During the conversion phase, a window 603 (FIGS. 6B and 6C) will slide from one end of the volume 135 to the other end of the volume in the direction 604, as shown in FIG. 6C. The size of the window 603 is typically equal to the size of the reserve space (free space) 605 (FIG. 6B), so that data to be converted in the window 603 can fit into free space 605. The sliding window 603 is positioned at the start of the old Section 601 and covers cipher text data only.

The conversion daemon 150 watches the amount 160 (FIG. 1) of available processor cycles and an amount 161 of available disk I/O (input/output) bandwidth. If the amount 160 of available processor cycles 160 is above (or has reached) a threshold value T1 and the amount 161 of available disk I/O bandwidth is above (or has reached) a threshold value T2, then the conversion daemon 150 will perform the read-convert-write-slide steps (as similarly discussed above) in order to convert the data in the volume 135. During the conversion of data, the conversion daemon 150 will read the cipher text data 607 in the window 603, store the cipher text data 607 into buffer 180, and then convert the cipher text data 607 into a plain text data (in the buffer 180). The daemon 150 will then convert this plain text data into new cipher data that uses the new data encryption key 602a (FIG. 6B). Note that the persistent info data 602b is similar to the previously discussed persistent info data 202b (FIG. 2C) which tracks the size, position, and sliding direction of a window. The daemon 150 will then write the new cipher text 609 (which is uses the new key 602a) into new section 610 of volume 135. Note that the cipher data 609 that was converted from the cipher data 607 (in window 603) is initially written in the free space 605 of FIG. 6B. Free space 611 is always adjacent to the sliding window 603 and will store the converted text of the data currently overlapped by the window 603. FIG. 6C shows the new section 610 that contains the new cipher text data 609 which uses the new key 602a.

In FIG. 6D, the cleanup phase has been performed. During the cleanup phase, the daemon 150 will copy the EMD 602 (including key 602a and persistent info data 602b) over the beginning section 615 of volume 135. As previously mentioned above, the beginning section 615 previously contained the old key 202a (for previous cipher text 214) and old persistent info data 202b. The daemon 150 will also delete the EMD 602 from the end space 201b because the EMD 602 was copied to the beginning section 615 of the volume 135. Therefore, end space 201b will contain free space. Free space 620 remains in a position adjacent to the end space 201b.

Figure 7A:
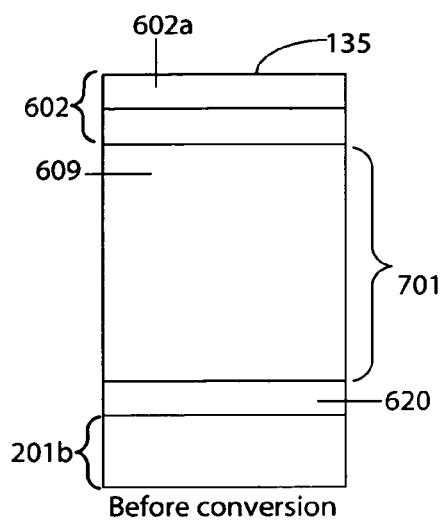

FIGS. 7A-7D illustrates an online data conversion method in accordance with an embodiment of the invention, where cipher text is converted to cipher text (re-keying method) for a second occurrence. The state of the volume 135 in FIG. 7A is, for example, the same as the state of the volume 135 in FIG. 6D. The old section 701 of volume 135 will contain the cipher text 609 which uses the previously discussed data encryption key 602a. Note that at this time, the EMD 602 (including the old key 602a) will be in the beginning section 615 of volume 135.

As previously mentioned above, re-keying is periodically performed by some businesses for purposes of improved data security. If the cipher text 609 will be converted to a new cipher text 709 (FIG. 7C) that uses the new data encryption key 702a, then the below procedure will occur.

During the preparation phase, the daemon 150 will create another new EMD 702 (FIG. 7B) which will contain a new data encryption key 702a for re-encrypting the cipher text data 609 into a new cipher text data 709 (FIG. 7C) as discussed below. The daemon 150 will write the EMD 702 in the end section 201b of volume 135. Free space 721 will typically remain for disk blocks (in the end section 201b) that do not contain any of the EMD 702 information.

Figure 7B:
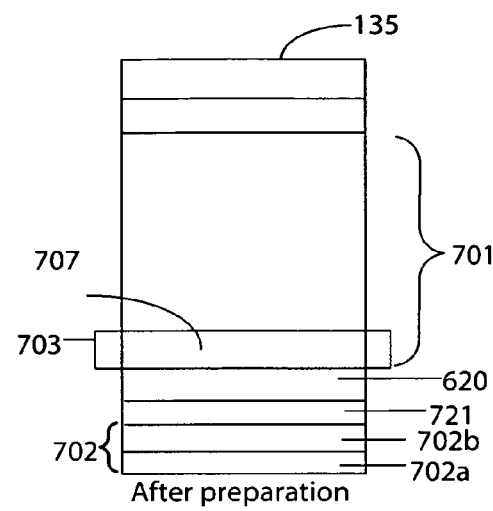

During the conversion phase, a window 703 (FIGS. 7B and 7C) will slide from one end of the volume 135 to the other end of the volume in the direction 704, as shown in FIG. 7C. The size of the window 703 is typically equal to the size of the reserve space (free space) 620 (FIG. 7B). The sliding window 703 is positioned at the end of the old Section 701 and covers the cipher text data 609 only.

The conversion daemon 150 watches the amount 160 (FIG. 1) of available processor cycles and an amount 161 of available disk I/O (input/output) bandwidth. If the amount 160 of available processor cycles 160 is above (or has reached) a threshold value T1 and the amount 161 of available disk I/o bandwidth is above (or has reached) a threshold value T2, then the conversion daemon 150 will perform the read-convert-write-slide steps (as similarly discussed above) in order to convert the data in the volume 135. During the conversion of data, the conversion daemon 150 will read the cipher text data 707 in the window 603, and then convert the cipher text data 707 into a plain text data (in the buffer 180). The daemon 150 will then convert this plain text data into the new cipher data 709 that uses the new data encryption key 702a (FIG. 7B). Note that the persistent info data 702b is similar to the previously discussed persistent info data 202b (FIG. 2C) which tracks the size, position, and sliding direction of a window. The daemon 150 will then write the new cipher text data 709 (which is uses the new key 702a) into new section 710 of volume 135. Note that the cipher data 709 that was converted from the cipher data 707 (in window 703) is initially written into the free space 620 of FIG. 7B. The window 703 and free space 620 are at the same sizes so that any data read from window 703 can fit as a converted data into the free space 620. Free space 711 is always adjacent to the sliding window 703 and will store the converted text of the data currently overlapped by the window 703. FIG. 7C shows the new section 710 that contains the new cipher text data 709 which uses the new key 702a.

In FIG. 7D, the cleanup phase has been performed. During the cleanup phase, the daemon 150 will copy the EMD 702 (including key 702a and persistent info data 702b) over the beginning section 602 of volume 135. As previously mentioned above, the beginning section 602 previously contained the old key 602a and old persistent info data 602b. The daemon 150 will also delete the EMD 702 from the end space 201b because the EMD 702 was copied to the beginning section 602 of the volume 135. Therefore, end space 201b will contain free space. Free space 720 remains in a position adjacent to the end space 602.

An embodiment of the invention provides the above discussed online data conversion methods that have various advantages. First, the downtime for applications is reduced because an embodiment of the invention eliminates the required backup step of previous systems. In contrast, an embodiment of the invention permits an application downtime to only occur during the preparation phase and clean up phase, and application downtime is minimized to typically only a few minutes. Second, an embodiment of the invention performs the online data conversion when the available processor cycles and available disk I/O bandwidth are above threshold values which are tunable. Therefore, the user can set the performance impact on the applications to be at a minimum during the online data conversion process. Third, free space is always adjacent to the sliding window and will store the data converted from the original data that is overlapped by the window. Therefore, the converted data will not overwrite any current data in the volume. Additionally, metadata (persistent info data) that indicates the size, position, and direction of the window is maintained and accessed by the conversion daemon 150. This free space and persistent info data advantageously avoids the occurrence of data corruption after system re-start, as discussed above.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for online data conversion, comprising:
    reading data that is overlapped by a window in a first position in a volume, wherein the volume is on a physical disk;
    converting the data into a converted text;
    writing tile converted text into the volume, wherein the volume in on the physical disk;
    sliding the window to a second position in the volume wherein the reading, the converting, the writing and the sliding are performed without requiring backup of any portion of the data; and
    checking an availability of processor cycles and an availability of disk input/output bandwidth; and if the availability of the processor cycles exceeds a first threshold value and the availability of the disk input/output bandwidth exceeds a second threshold value, then reading the data that is overlapped by the window.

2. The method of claim 1, wherein converting the data comprises:
    converting plain text to cipher text.

3. The method of claim 1, wherein converting the data comprises:
    converting cipher text to plain text.

4. The method of claim 1, wherein converting the data comprises:
    converting a first cipher text to plain text, wherein the cipher text uses a first data encryption key; and
    converting the plain text to a second cipher text that uses a second data encryption key.

5. The method of claim 4, wherein converting the data comprises:
    converting the second cipher text to plain text; and
    converting the plain text to a third cipher text that uses a third data encryption key.

6. The method of claim 1, further comprising:
    performing a preparation phase including:
    extending the volume by adding an extended section; and
    storing encryption metadata in the extended section.

7. The method of claim 1, further comprising:
    performing a cleanup phase including:

converting the data into plain text;
deleting encryption metadata in an extended section; and
de-allocating the extended section.

8. The method of claim 1, further comprising:
servicing a request from an application during a first state when available resources are being monitored.

9. The method of claim 8, further comprising:
buffering a request from an application during a second state when data is being read from the window, when data from the window is being converted into converted text, when converted text is being written into the volume, or when the window is being moved to another position.

10. The method of claim 1, further comprising:
reading persistent info data in the volume, in order to determine a position of the window prior to a system re-start.

11. The method of dam 1, wherein writing the converted text into the volume comprises:
writing the converted text into a free space that is adjacent to the window.

12. The method of claim 1, wherein the window comprises a set of disk blocks in the volume.

13. An apparatus for online data conversion, comprising:
a volume on a physical disk:
a processor; and
a conversion daemon that operates with the processor and is configured to read data that is overlapped by a window in a first position in the volume, convert the data into a converted text, write the converted text into the volume; slide the window to a second position in the volume wherein the data is read, the data is converted, the converted text is written and the window is slid without requiring backup of any portion of the data, wherein the volume is on the physical disk when the data is read and the converted text is written to the volume; and check an availability of processor cycles and an availability of disk input/output bandwidth; and if the availability of the processor cycles exceeds a first threshold value and the availability of the disk input/output bandwidth exceeds a second threshold value, then reading the data that is overlapped by the window.

14. The apparatus of claim 13, wherein the conversion daemon converts plain text to cipher text.

15. The apparatus of claim 13, wherein the conversion daemon converts plain text to cipher text.

16. The apparatus of claim 13, wherein the conversion daemon converts cipher text to plain text.

17. The apparatus of claim 13, wherein the conversion daemon convert a first cipher text to plain text, wherein the cipher text uses a first data encryption key, and converts the plain text to a second cipher text that uses a second data encryption key.

18. The apparatus of claim 17, wherein the conversion daemon converts the second cipher text to plain text, and converts the plain text to a third cipher text that uses a third data encryption key.

19. The apparatus of claim 13, wherein the conversion daemon performs a preparation phase including: extending the volume by adding an extended section; and storing encryption metadata in the extended section.

20. The apparatus of claim 13, wherein the conversion daemon performs a cleanup phase including; converting the data into plain text; deleting encryption metadata in an extended section; and de-allocating the extended section.

21. The apparatus of claim 13, further comprising:
a data encryption driver configured to service a request from an application during a first state when available resources are being monitored by the conversion daemon.

22. The apparatus of claim 21, wherein the data encryption driver buffers a request from an application during a second state when data is being read from the window, when data from the window is being converted into converted text, when converted text is being written into the volume, or when the window is being moved to another position.

23. The apparatus of claim 13, wherein the conversion daemon reads persistent info data in the volume, in order to determine a position of the window prior to a system re-start.

24. The apparatus of claim 13, wherein the conversion daemon writes the converted text into a free space that is adjacent to the window.

25. The apparatus of claim 13, wherein the window comprises a set of disk blocks in the volume.

26. An apparatus for online data conversion, comprising:
means for reading data that is overlapped by a window in a first position in a volume, wherein the volume is on a physical disk;
means for converting the data into a converted text;
means for writing the converted text into a free space of the volume, wherein the free space is adjacent to the window;
means for sliding the window to a second position in the volume wherein the reading, the converting, the writing and the sliding are performed without requiring backup of any portion of the data and wherein the volume is on the physical disk when the data is read and the converted text is written; and
means for checking an availability of processor cycles and an availability of disk input/output bandwidth; and if the availability of the processor cycles exceeds a first threshold value and the availability of the disk input/output bandwidth exceeds a second threshold value, then reading the data that is overlapped by the window.

27. An article of manufacture comprising:
a non-transitory computer-readable storage medium having stored thereon instructions to:
read data that is overlapped by a window in a first position in a volume, wherein the volume is on a physical disk;
convert the data into a converted text;
write the converted text into a free space of the volume wherein the free space is adjacent to the window;
slide the window to a second position in the volume wherein the data is read, the data is converted, the converted text is written and the window is slid without requiring backup of any portion of the data and wherein the volume is on the physical disk when the data is read and the converted text is written; and
check an availability of processor cycles and an availability of disk input/output bandwidth; and if the availability of the processor cycles exceeds a first threshold value and the availability of the disk input/output bandwidth exceeds a second threshold value, then reading the data that is overlapped by the window.

* * * * *

UNITED STATES PATENT AND TRADEMARK OFFICE
CERTIFICATE OF CORRECTION

PATENT NO. : 8,712,035 B2  
APPLICATION NO. : 12/012292  
DATED : April 29, 2014  
INVENTOR(S) : Hemant Mittal et al.

Page 1 of 1

It is certified that error appears in the above-identified patent and that said Letters Patent is hereby corrected as shown below:

In the Claims

In column 12, line 33, in Claim 1, delete "tile" and insert -- the --, therefor.

In column 12, line 34, in Claim 1, delete "in" and insert -- is --, therefor.

In column 13, line 18, in Claim 11, delete "dam" and insert -- claim --, therefor.

In column 13, line 25, in Claim 13, delete "disk:" and insert -- disk; --, therefor.

In column 13, line 63, in Claim 20, delete "including;" and insert -- including: --, therefor.

In column 14, line 49, in Claim 27, delete "volume" and insert -- volume, --, therefor.

Signed and Sealed this  
Twenty-sixth Day of August, 2014

Michelle K. Lee  
*Deputy Director of the United States Patent and Trademark Office*